United States Patent
Dai et al.

(10) Patent No.: US 10,205,151 B2
(45) Date of Patent: Feb. 12, 2019

(54) CONNECTOR FROM THE TAB OF AN ELECTRODE CURRENT COLLECTOR TO THE TERMINAL PIN OF A FEEDTHROUGH IN AN ELECTROCHEMICAL CELL

(71) Applicant: Greatbatch Ltd., Clarence, NY (US)

(72) Inventors: Xiangyang Dai, East Amherst, NY (US); Mark J. Roy, Buffalo, NY (US)

(73) Assignee: Greatbatch Ltd., Clarence, NY (US)

( * ) Notice: Subject to any disclaimer, the term of this patent is extended or adjusted under 35 U.S.C. 154(b) by 298 days.

(21) Appl. No.: 15/289,392

(22) Filed: Oct. 10, 2016

(65) Prior Publication Data
US 2017/0033349 A1    Feb. 2, 2017

Related U.S. Application Data

(63) Continuation-in-part of application No. 13/867,178, filed on Apr. 22, 2013.

(60) Provisional application No. 61/635,901, filed on Apr. 20, 2012.

(51) Int. Cl.
*H01M 2/06* (2006.01)
*H01M 2/22* (2006.01)
(Continued)

(52) U.S. Cl.
CPC ............ *H01M 2/26* (2013.01); *B23K 26/20* (2013.01); *H01M 2/065* (2013.01); *H01M 2/22* (2013.01); *H01M 2/30* (2013.01); *H01M 4/382* (2013.01); *H01M 4/405* (2013.01); *H01M 4/485* (2013.01); *H01M 4/505* (2013.01); *H01M 4/525* (2013.01); *H01M 4/5815* (2013.01); *H01M 4/66* (2013.01); *H01M 10/052* (2013.01);
(Continued)

(58) Field of Classification Search
None
See application file for complete search history.

(56) References Cited

U.S. PATENT DOCUMENTS 4,252,263 A    2/1981 Houston
4,761,355 A    8/1988 Skarstad et al.
(Continued)

FOREIGN PATENT DOCUMENTS

EP    0532312    3/1993
EP    1282178    2/2003
(Continued)

OTHER PUBLICATIONS

European Search, Application 10192075, EP2325928, dated Jun. 16, 2011.

*Primary Examiner* — Jonathan Crepeau
(74) *Attorney, Agent, or Firm* — Michael F. Scalise

(57) ABSTRACT

A process for creating a laser braze weld joint between a current collector and a terminal pin in the construction of electrochemical cells is described. The laser braze welding process utilizes a laser weld instrument to create a braze-like joint between two work pieces. The weld joint is created by controlling the amount of laser heat and energy imparted to the work pieces through proper control and positioning of the laser beam with respect to the work pieces. Preferably, the method is used to bond the terminal pin to the cathode current collector. This method of attachment is suitable for either primary or secondary cells, particularly those powering implantable biomedical devices.

20 Claims, 11 Drawing Sheets

(51) Int. Cl.
  *H01M 2/26* (2006.01)
  *H01M 2/30* (2006.01)
  *B23K 26/20* (2014.01)
  *H01M 4/38* (2006.01)
  *H01M 4/40* (2006.01)
  *H01M 4/485* (2010.01)
  *H01M 4/505* (2010.01)
  *H01M 4/525* (2010.01)
  *H01M 4/58* (2010.01)
  *H01M 4/66* (2006.01)
  *H01M 10/052* (2010.01)
  *H01M 2/02* (2006.01)
  *B23K 101/38* (2006.01)

(52) U.S. Cl.
  CPC . *B23K 2101/38* (2018.08); *H01M 2002/0205* (2013.01); *H01M 2220/30* (2013.01)

(56) References Cited

U.S. PATENT DOCUMENTS

| | | |
|---|---|---|
| 4,865,932 A | 9/1989 | Masuda et al. |
| 5,250,373 A | 10/1993 | Muffoletto et al. |
| 5,354,629 A | 10/1994 | Kuroda et al. |
| 5,571,146 A | 11/1996 | Jones et al. |
| 5,750,286 A | 5/1998 | Paulot et al. |
| 5,786,559 A | 7/1998 | Ottino et al. |
| 6,503,640 B2 | 1/2003 | Wittebrood et al. |
| 6,929,881 B2 | 8/2005 | Wutz et al. |
| 7,081,142 B1 | 7/2006 | Carlson |
| 7,108,942 B1 | 9/2006 | Gan et al. |
| 7,341,802 B1 | 3/2008 | Ota et al. |
| 7,539,007 B2 | 5/2009 | Zhao et al. |
| 7,622,219 B2 | 11/2009 | Ota et al. |
| 9,553,296 B1* | 1/2017 | Dai .................. H01M 2/22 |
| 2001/0003863 A1 | 6/2001 | Thibault et al. |
| 2004/0038070 A1 | 2/2004 | Dockus et al. |
| 2006/0035147 A1 | 2/2006 | Lam et al. |
| 2007/0037054 A1 | 2/2007 | Kikuchi et al. |
| 2009/0246617 A1 | 10/2009 | Howard et al. |

FOREIGN PATENT DOCUMENTS

| | | |
|---|---|---|
| EP | 1791198 | 5/2007 |
| EP | 1876668 | 1/2008 |
| EP | 2083462 | 7/2009 |
| EP | 2317589 | 5/2011 |
| EP | 2325928 | 5/2011 |

* cited by examiner

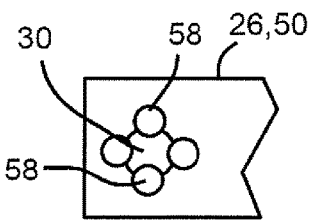 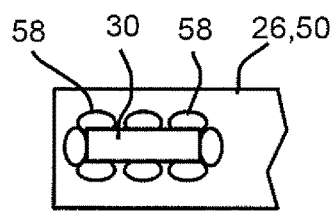 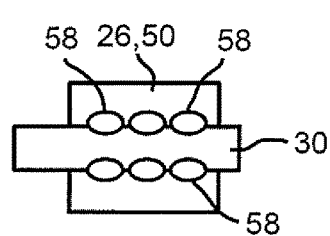
FIG. 8A   FIG. 8B   FIG. 8C
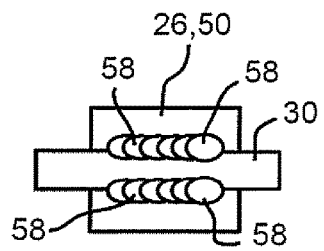 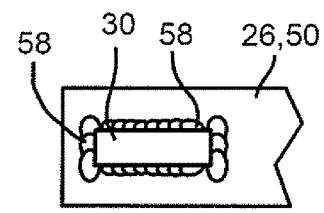 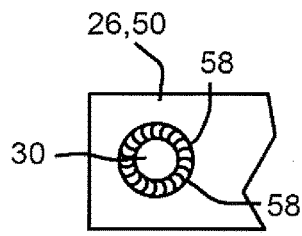
FIG. 8D   FIG. 8E   FIG. 8F

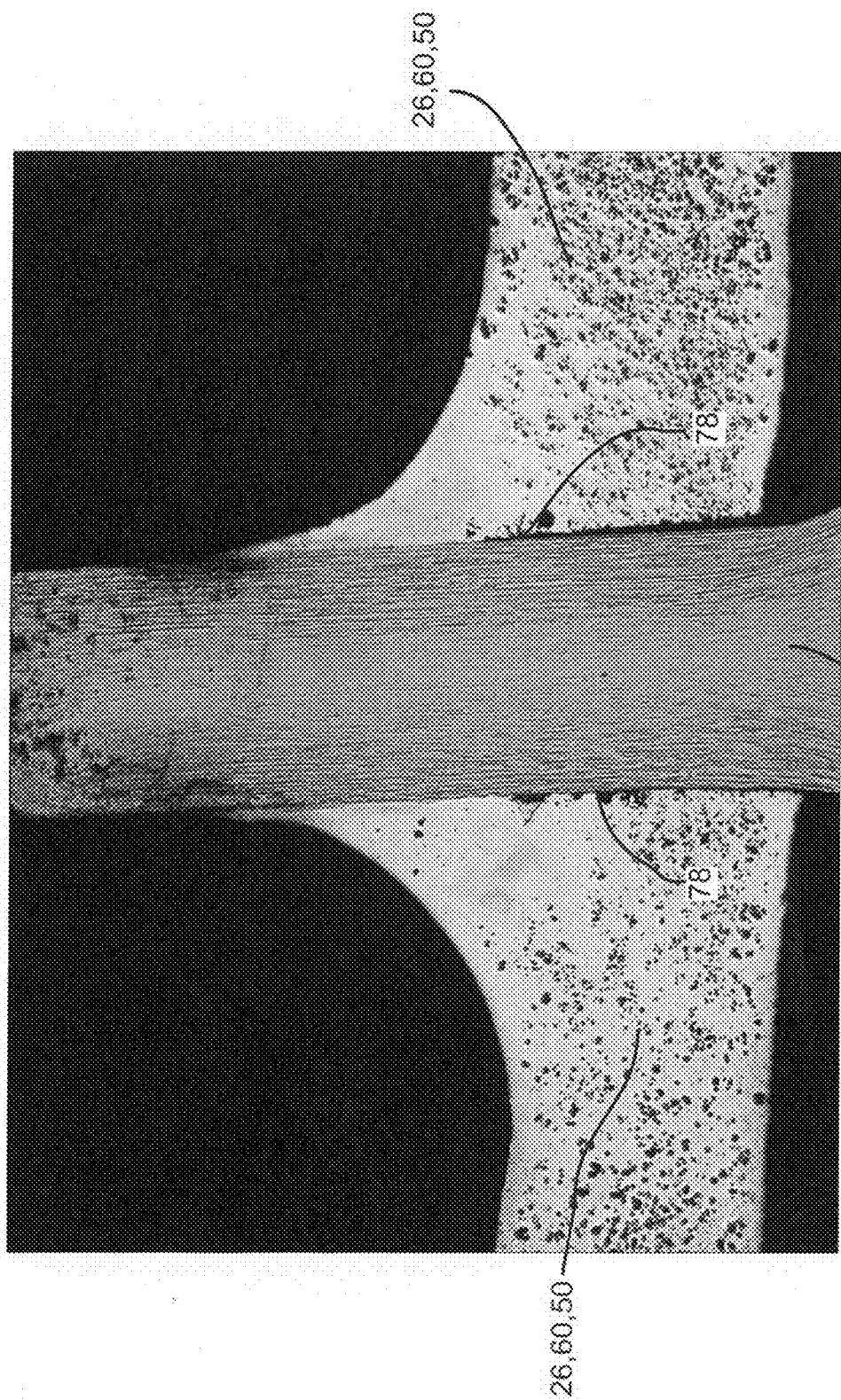

CONNECTOR FROM THE TAB OF AN ELECTRODE CURRENT COLLECTOR TO THE TERMINAL PIN OF A FEEDTHROUGH IN AN ELECTROCHEMICAL CELL

CROSS-REFERENCE TO RELATED APPLICATION

This application is a continuation-in-part of U.S. application Ser. No. 13/867,178, filed on Apr. 22, 2013, now abandoned, which claims priority from U.S. Provisional Application Ser. No. 61/635,901, filed Apr. 20, 2012.

BACKGROUND OF THE INVENTION

1. Field of the Invention

The present invention relates to the art of electrochemical cells, and more particularly, to an improved method of connecting a current collector to a terminal pin. The present invention is of a laser welding method by which a braze-like weld joint is formed between the terminal pin and the current collector.

2. Prior Art

The recent rapid development in small-sized electronic devices having various shape and size requirements requires comparably small-sized electrochemical cells of different designs that can be easily manufactured and used in these electronic devices. Preferably, the electrochemical cell has a high energy density, and one commonly used cell configuration is a prismatic, case-negative cell design having an intermediate cathode flanked by opposed anode components in contact with the casing and in electrical association with the cathode.

The diverse variety of materials used in the construction of electrochemical cells increases the difficulty of assembling and manufacturing such small intricate devices. It is desirable to build such electrochemical cells with simplified procedures that create an electrochemical cell with a durable and robust construction. Such electrochemical cells require joining various internal components, composed of differing materials, with a strong durable bond. One of these critical connections is that of the terminal pin to the current collector. The terminal pin connects the electrochemical cell's internal current collector to a load such as an implantable medical device.

However, because of the diverse materials with their respective distinct material properties, it is sometimes difficult to join and bond these components together. Prior art bonding techniques, such as traditional laser and resistance welding practices, are not always ideal in joining components such as terminal pin and current collector materials.

Specifically with respect to electrochemical cells, joining the terminal pin, typically composed of molybdenum, to that of the current collector, typically composed of aluminum or titanium, has been historically problematic. The diverse material properties, particularly the difference in melting temperature between molybdenum and aluminum or titanium, create problems in joining these different materials directly together. In the case of traditional laser welding, two work pieces, which are desired to be joined, are first positioned in direct contact with each other. An energized laser beam is then directed at the work piece interface, thus fusing them together. In doing so, a heat-affected zone is typically created in which an inter-metallic bond between the fused materials is formed.

The formation of such an intermetallic bond, within the heat-affected zone, may create an undesirable brittle bond. Furthermore, it may not be possible, given the distinctive compositions of the work pieces, to join such materials using traditional laser or resistance welding techniques. For example, materials exhibiting a wide difference in melting temperatures, such as molybdenum, having a melting temperature of about 2,617° C. and aluminum, having a melting temperature of about 660° C. may be difficult to join together. The heat required to melt molybdenum may significantly damage the lower melting temperature aluminum.

Therefore, to address this problem, a coupling sleeve 53 (FIGS. 2 and 3) generally comprising aluminum, was developed to facilitate bonding of the terminal pin to the current collector. In this prior method, the sleeve 53 is positioned over the molybdenum terminal pin. After the sleeve 53 is properly positioned over the terminal pin, a laser beam is typically focused through a side sleeve opening 55 directly applying the beam onto the exterior surface of the terminal pin at a perpendicular orientation with respect to the exterior surface of the terminal pin.

The intensive heat from the laser beam burns a cavity within the side of the terminal pin. This cavity is then typically filled with a second material, which creates a metallurgical bond between the coupling sleeve and the pin. Such a cavity is generally not desirable. Formation of the cavity within the side of the pin decreases its cross sectional area, and may decrease the mechanical strength of the pin. Furthermore, the addition of the second material within the cavity may create a brittle bond. In addition, this prior art laser welding technique requires exacting precision in bonding the materials together, which adds manufacturing complexity. Furthermore, such intermediate materials and processes can create brittle bonds that may not be sufficiently robust.

The present invention provides an improved means of joining dissimilar materials. More specifically, the present welding method enables an improved joining of different materials that are typically utilized in the manufacture of electrochemical cells. The present invention provides a laser welding method that utilizes heat generated from a laser beam to create a braze-like joint between work pieces. Thus, the need to burn a cavity within the external surface of a work piece is eliminated. Furthermore, the present invention eliminates the creation of an intermetallic bond within the weld connection. The laser welding method of the present invention reduces cost, complexity and creates a more robust connection. Lastly, the laser braze welding process of the present invention is fast, simple, easy to control and effective.

SUMMARY OF THE INVENTION

The present invention relates to a method of joining an electrode current collector, particularly the tab of the current collector, to a terminal pin. The present invention further relates to a method of connecting the terminal pin to the current collector of different material compositions, geometries and configurations. Specifically, the present invention is a method in which a laser beam is utilized to form a braze-like weld between two work pieces, i.e. a terminal pin and current collector of an electrochemical cell.

The braze-like laser weld is achieved by creating a balance of heat and energy being applied to the respective work pieces by the laser beam. More specifically, this energy balance is achieved by controlling the position of the laser beam with respect to the exterior surfaces of the two adjacently positioned work pieces. One variable that is controlled is the distance between the end of the laser beam and the exterior surface of an adjacent second work piece. A second variable that is controlled is the angle at which the laser beam is focused on the surface of the corresponding first work piece. Thus, by optimally controlling these parameters for each specific work piece material, a robust braze-like connection can be achieved. The work pieces may be of similar or dissimilar melting temperatures, i.e., a terminal pin and a current collector. In addition, the laser welding method of the present method may be used to form a direct connection between the terminal pin and the current collector or, alternatively, an intermediate material or coupler may be used to facilitate bonding between the pin and current collector.

In this laser welding method, two dissimilar materials, particularly of significantly dissimilar melting temperatures, are joined together in a strong bond. In that respect, the present invention comprises a method by which materials having dissimilar melting temperatures are joined in a braze-like joint created by the application of an energized laser beam.

In the present invention, two metals or work pieces are first positioned such that they are adjacent to each other. A laser beam is then directed onto an external surface of the first work piece. The end of the beam is positioned at an offset distance away from the external surface of the adjacently positioned second work piece. In addition, the laser beam is directed onto the external surface of the first work piece at an incident angle such that the laser beam is not perpendicular to the surface of the first work piece. Unlike traditional laser welding, the laser beam is not focused at the junction between the two work pieces. Instead, the laser beam is focused solely on a portion of the surface of a first work piece and not on an adjacent surface of a second work piece. It is preferred that the first work piece has a melting temperature that is lower than the second work piece.

Once energized, heat and energy emanating from the laser beam melt a portion of the material of the first work piece. In addition, heat and energy emanating from the laser beam, while not directly focused on the second work piece, conditions the adjacent surface of the second work piece such that enough surface energy is created to cause some of the melted material of the first work piece to coat or wet a portion of the adjacently positioned second work piece. Once cooled, a braze-like joint between the two work pieces is created.

Alternatively, an intermediate material or coupler may be positioned between the work pieces that are desired to be joined. In this embodiment, the intermediate material, having a lower melting temperature as compared to at least the first work piece, is positioned between and adjacent the first and second work pieces. Similarly, the laser beam is focused on the external surface of the intermediate coupler material thereby causing the melted coupler to coat the adjacent work piece, thus, forming a braze-like joint therebetween. In a similar manner, the laser beam could also be used to form a braze joint at the opposite end of the intermediate coupler and the second work piece.

Thus, the laser welding process of the present invention is capable of joining metals of dissimilar composition, melting temperature, and/or mechanical properties. Unlike traditional laser and resistance welding techniques, in which respective portions of work pieces are heated together such that they form an intermetallic bond therebetween, the laser braze welding process of the present invention forms a braze-like joint in which intermetallic bonding is eliminated. Such intermetallic bonds, particularly those formed within heat affected fusion zones, typically exhibit poor durability and are, therefore, not generally desired for use in an electrochemical cell. Furthermore, because of dissimilarities in composition, not all metals are capable of being joined by laser and resistive welding techniques. In either case, the combination of possible joined materials is generally limited when utilizing traditional laser and resistance joining techniques.

In a preferred embodiment, a molybdenum terminal pin is joined to an aluminum current collector utilizing an intermediate material. Generally, a current collector is in electrical contact with the active material that comprises the anode, the active material that comprises the cathode, or both. The terminal pin may be joined to a single anode or cathode current collector or to multiple anode and cathode current collectors, depending on the specific design and application requirements of the electrochemical cell. The present invention can also be utilized in a variety of rechargeable or non-rechargeable electrochemical cell designs and chemistries. That is in both case negative and case positive designs. In a case negative design, the anode is connected to the casing as the negative terminal. Alternatively, in a case positive design, the cathode is connected to the casing.

Furthermore, the laser braze welding process of the present invention is not limited to the connection of a molybdenum terminal pin to an aluminum current collector. Such a welding process can also be used to bond a series of metals of dissimilar melting temperatures, preferably metals in which their respective melting temperatures vary significantly. Furthermore, the welding process of the present invention is not limited to a specific geometry. The material to be welded may be of a plurality of geometries such as, but not limited to, a rectangular form, a curved body or a multi-sided polygon shape.

Thus, the present invention overcomes many inherent difficulties in constructing an electrochemical cell. The present invention increases the cell design capabilities by allowing the terminal pin to directly join to a wide variety of metals of differing melting temperatures that were previously very difficult, if not entirely incapable, of being bonded together with a resistance or a laser weld process. The present invention reduces manufacturing cost and reduces construction complexity. The present invention also allows for the utilization of different cell chemistries requiring the use of different current collector materials that would not normally allow for a direct connection with the terminal pin.

BRIEF DESCRIPTION OF THE DRAWINGS

FIGS. 8A-8F illustrate top views of various embodiments of the laser weld position with respect to the terminal pin 30 and current collector tab 50 or lid 26.

FIG. 10 is a micrograph of a cross-section taken of the laser braze weld of the present invention.

DETAILED DESCRIPTION OF THE PREFERRED EMBODIMENTS

Figure 1:
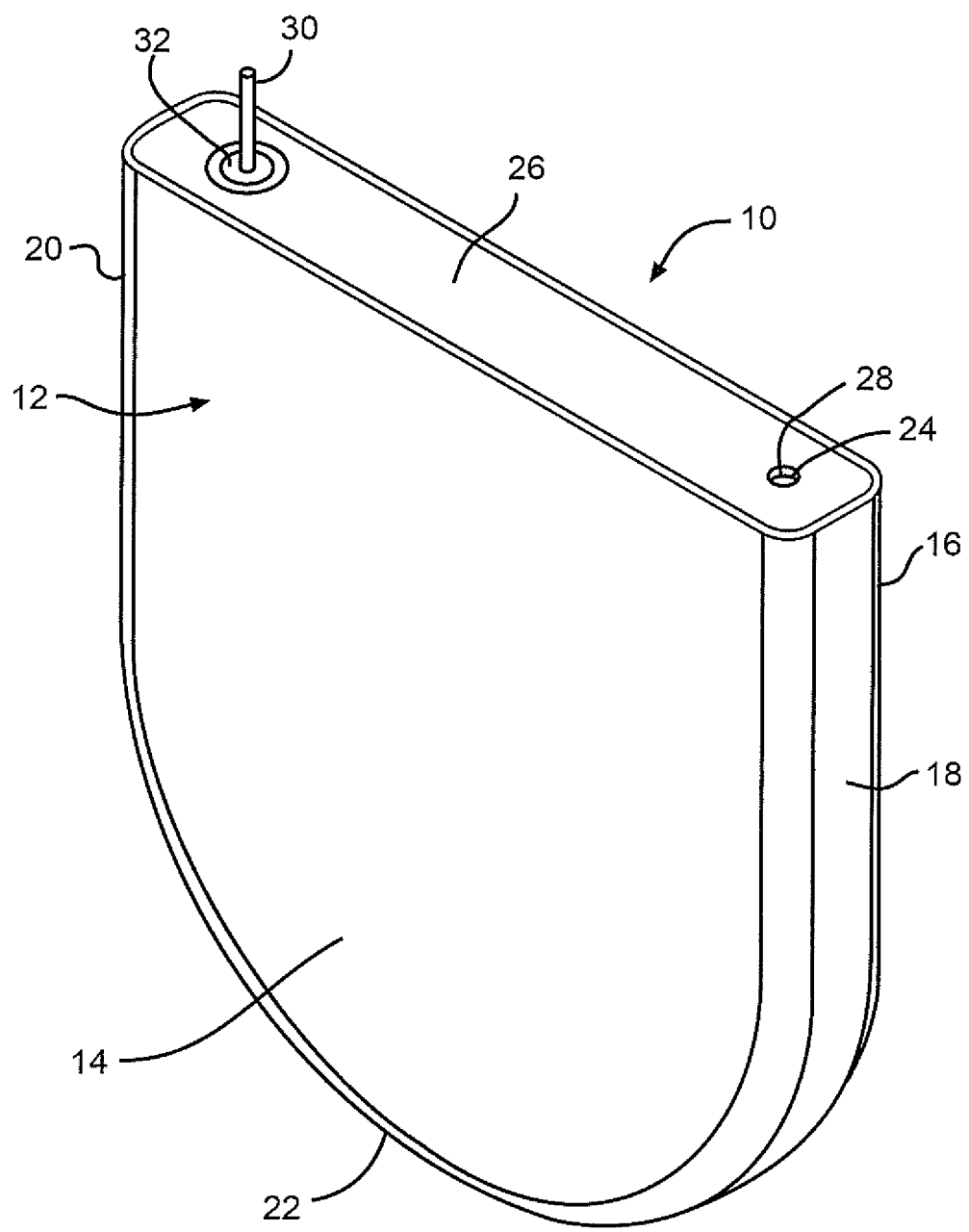
FIG. 1 is a perspective view of an electrochemical cell 10.
Figure 2:
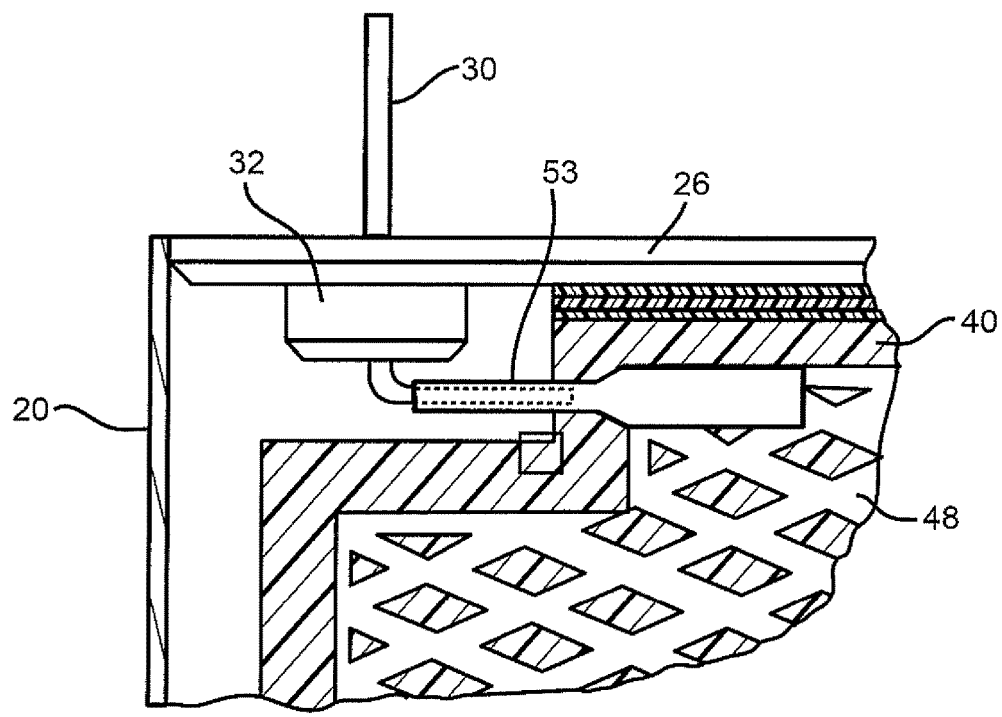
FIG. 2 is a cross-sectional view taken from the side illustrating the use of a prior art coupling sleeve 53 to facilitate the connection of a terminal pin 30 and current collector 48.
Figure 3:
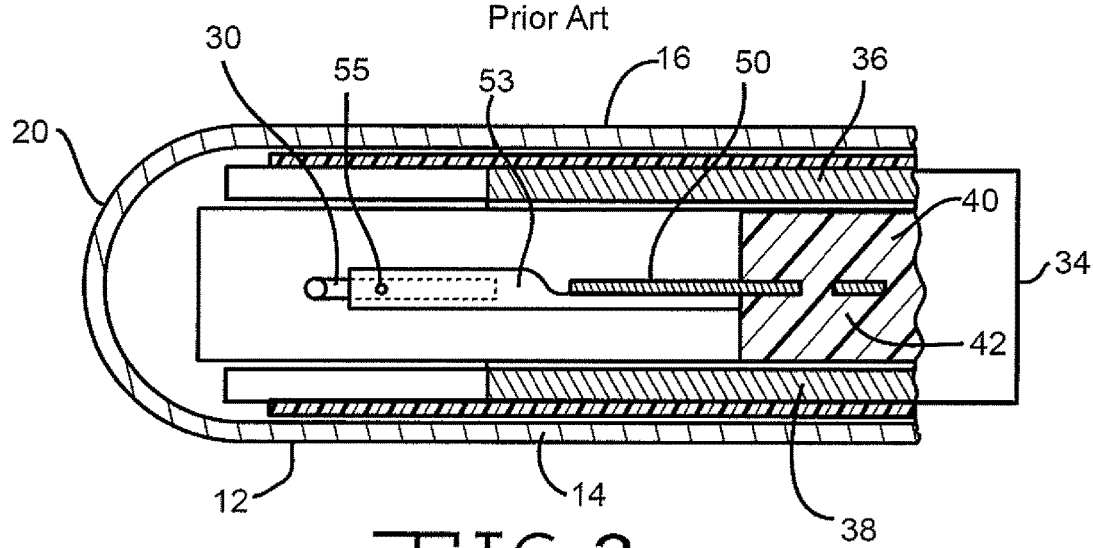
FIG. 3 is a cross-sectional view taken from the top depicting a prior art embodiment of the use of a coupling sleeve 53 to facilitate connection of a terminal pin 30 to a current collector tab 50.
Figure 4:
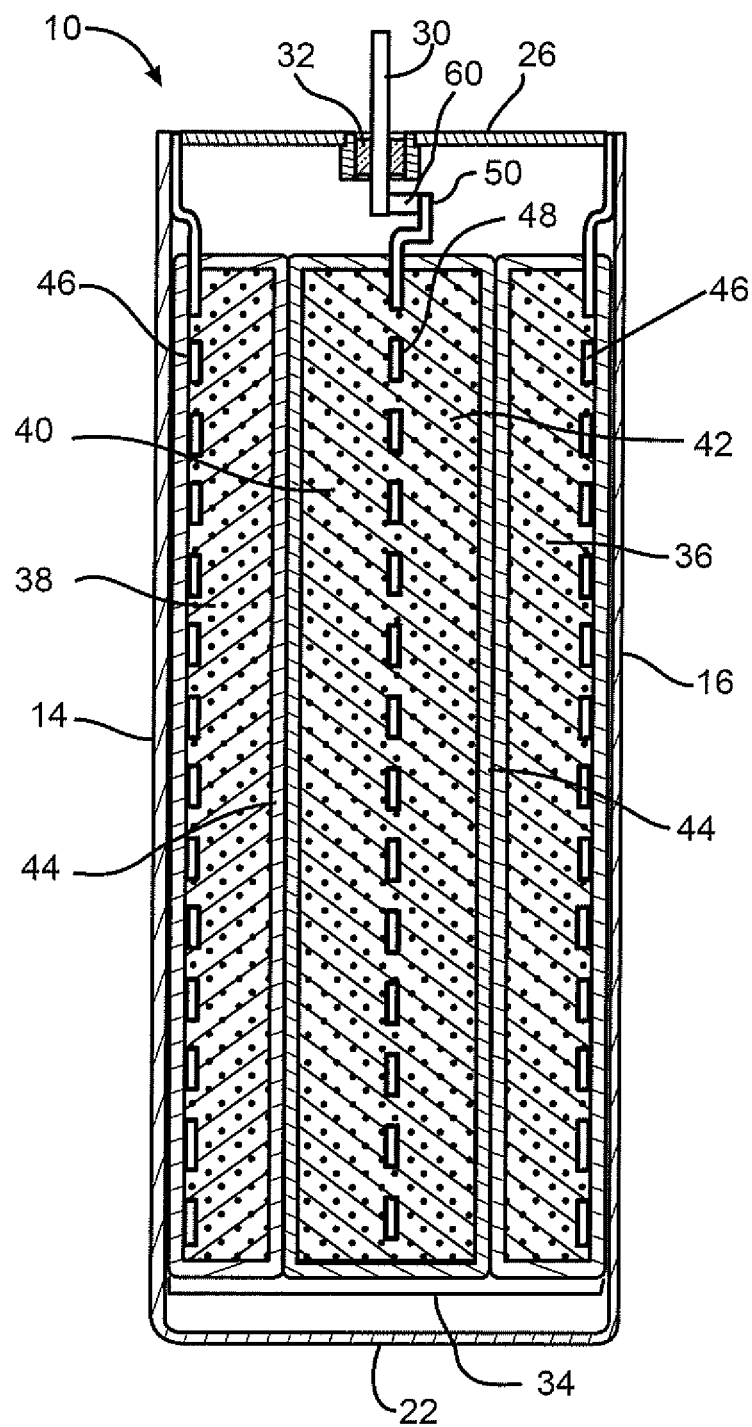
FIG. 4 is a cross-sectional view illustrating an embodiment in which a coupler 60 is used to facilitate a braze-like laser weld of the present invention connecting a terminal pin 30 to a current collector 48.
Figure 5:
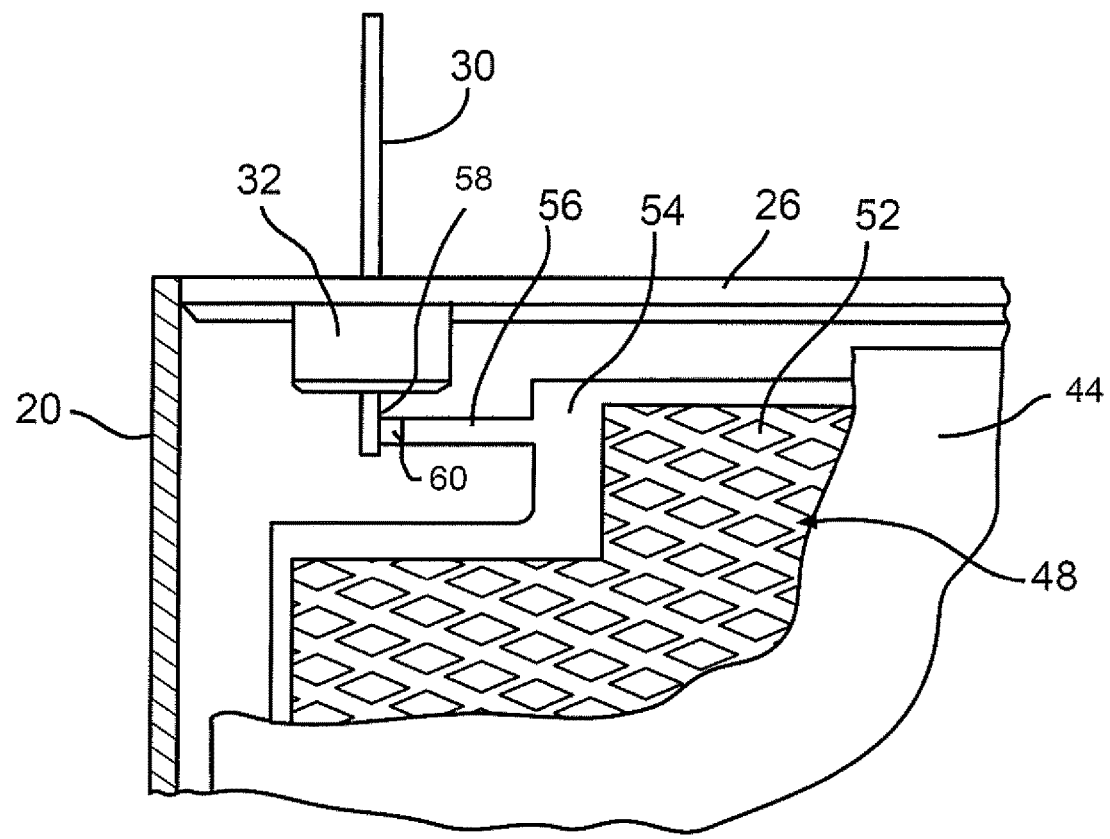
FIG. 5 is a cross-sectional view taken from the side showing an embodiment of a coupler 60 connecting the terminal pin 30 to the current collector 48 utilizing the laser braze weld of the present invention.

Referring now to FIGS. 1, 4 and 5, there is shown an electrochemical cell 10 comprising a casing 12 having spaced-apart front and back walls 14 and 16 joined by curved end walls 18 and 20 and a curved bottom wall 22. The end walls can be curved to provide the casing having an oval cross-section, or they can be generally planar to provide a rectangular or prismatic cross-section. The casing has an opening 24 provided in a lid 26 used for filling the casing 12 with an electrolyte after the cell components have been assembled therein and lid 26 has been welded to casing 12. In its fully assembled condition shown in FIG. 1, a closure means 28 is hermetically sealed in opening 24 to close the cell. A terminal pin 30 is electrically insulated from lid 26 and casing 12 by a glass-to metal seal 32, as is well known to those skilled in the art.

Cell 10 comprises an electrode assembly 34 (FIG. 4) that further comprises anode electrode components 36, 38 and cathode electrode components 40, 42 prevented from contacting each other by a separator membrane 44. The anode electrode components 36, 38 are composed of an anode active material supported on an anode current collector 46. The cathode electrode components 40, 42 are composed of an active cathode material that is supported on a cathode current collector 48. As shown in FIG. 4, the cathode current collector 48 may comprise a tab 50 that extends outwardly therefrom.

The embodiment shown in FIG. 1 is commonly referred to in the art as a case negative cell. Case negative electrochemical cells are constructed with anode electrode components 36, 38 that are electrically connected to casing 12 via the anode current collector 46 while the cathode electrode components 40, 42 are electrically connected to the terminal pin 30 via the cathode current collector 48. Alternatively, a case positive cell design may be constructed by reversing the connections. In other words, terminal pin 30 is connected to the anode electrode components 36, 38 via the anode current collector 46 and the cathode electrode components 40, 42 are connected to the casing 12 via the cathode current collector 48.

Both anode current collector 46 and the cathode current collector 48 are composed of an electrically conductive material. It should be noted that the electrochemical cell 10 of the present invention as illustrated in FIGS. 1 and 4 can be of either a rechargeable (secondary) or non-rechargeable (primary) chemistry of a case negative or case positive design. The specific geometry and chemistry of the electrochemical cell 10 can be of a wide variety that meets the requirements of a particular primary and/or secondary cell application.

As shown in FIG. 5, the cathode current collector 48 of the present invention generally comprises a screen 52, an internal connection tab 54 in the form of a land that is co-planar with and surrounded by screen 52, and an integral external connection tab 56. Screen, as pertains to the present invention, is defined herein as a surface on which cathode or anode active material is deposited. A screen may be comprised of a foil having a solid surface or of a mesh or grid having a series of perforations throughout its surface.

Anode current collector 46 of the present invention, similarly to the cathode current collector 48, also generally comprises a screen 52, an internal connection tab 54 in the form of a land that is co-planar with and surrounded by screen 52, and an integral external connection tab 56.

In a first embodiment of the present invention, external connection tab 56, of either an anode current collector 46 or cathode current collector 48, is an outwardly extending continuation of internal tab 54. External tab 56 may not necessarily be coplanar with internal connection tab 54 and screen 52. External tab 56 may be of an extended, elongated strip of metal such as in a ribbon or coil form, which may not be coplanar with either.

As shown in FIG. 5, weld area 58 is where two metals meet and are joined together. The weld area 58 may comprise the location in which two metals of similar or dissimilar composition are joined together. The weld area 58 may further comprise the location where terminal pin 30 is joined to a region of the current collector 46, 48 such as the external tab 56. Thus, depending on the desired position of terminal pin 30 in cell 10, connection tabs 54 and 56 can be of various lengths or shapes to provide additional flexibility in joining the terminal pin 30 to the current collector 48.

For example, if the design of the cell 10 requires terminal pin 30 to be positioned closer to or farther away from the center of lid 26, the current collector 48 of the present invention easily accommodates the design changes without having to be changed itself. Terminal pin 30 may be joined to a different contact point on either the internal connection tab 54 or the external connection tab 56. Terminal pin 30 may also be joined directly to the current collector screen 52. Of course, there may be cell constructions where it is desirable to connect terminal pin 30 to multiple locations along the current collector 48. Such locations may include but are not limited to, the internal tab 54, the external tab 56 and the current collector screen 52. In addition, multiple current collector tabs 56 may be connected to terminal pin 30.

It will be apparent to those skilled in the art that terminal pin 30 can be directly joined to the current collector 48 at any contact point along the extent of the internal tab 54 and the external tab 56 by using the present laser braze weld procedure. It will also be apparent to those skilled in the art that terminal pin 30 may be joined at any point along the anode or cathode current collector 46, 48.

Alternatively, as shown in FIGS. 4 and 5, a coupler or intermediate material 60 may be used to facilitate the laser weld 58 between the terminal pin 30 and the current collector 46, 48. In a preferred embodiment, the coupler 60 is positioned adjacent the terminal pin 30 and a member of the current collector 46, 48. As shown in FIG. 4, the coupler 60 is positioned between the terminal pin 30 and tab 50. FIG. 5 illustrates another embodiment in which the coupler 60 is positioned between the terminal pin 30 and external tab 56 of current collector 48. In this case, it is preferred that the coupler 60 comprises a material such as aluminum, titanium, nickel or stainless steel.

In an alternate embodiment, the electrochemical cell 10 may be designed in a case negative embodiment in which cathode current collector 48 is directly joined to terminal pin 30. It is contemplated that anode current collector 46 could be substituted for cathode current collector 48 creating a case positive cell design.

Figure 6:
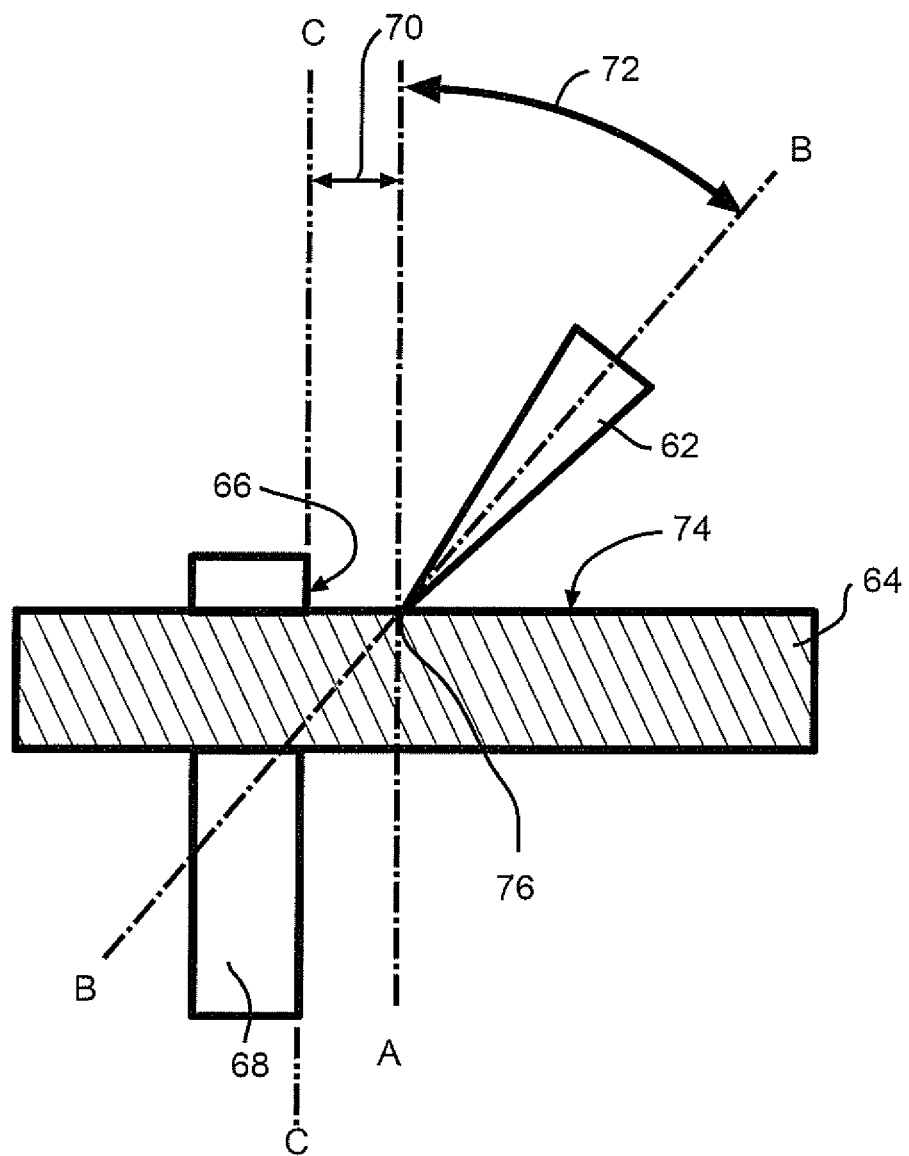
FIG. 6 is a cross-sectional view taken from the side illustrating an embodiment of a laser beam being focused on a surface of a work piece prior to the formation of the braze-like laser weld of the present invention.
Figure 6A:
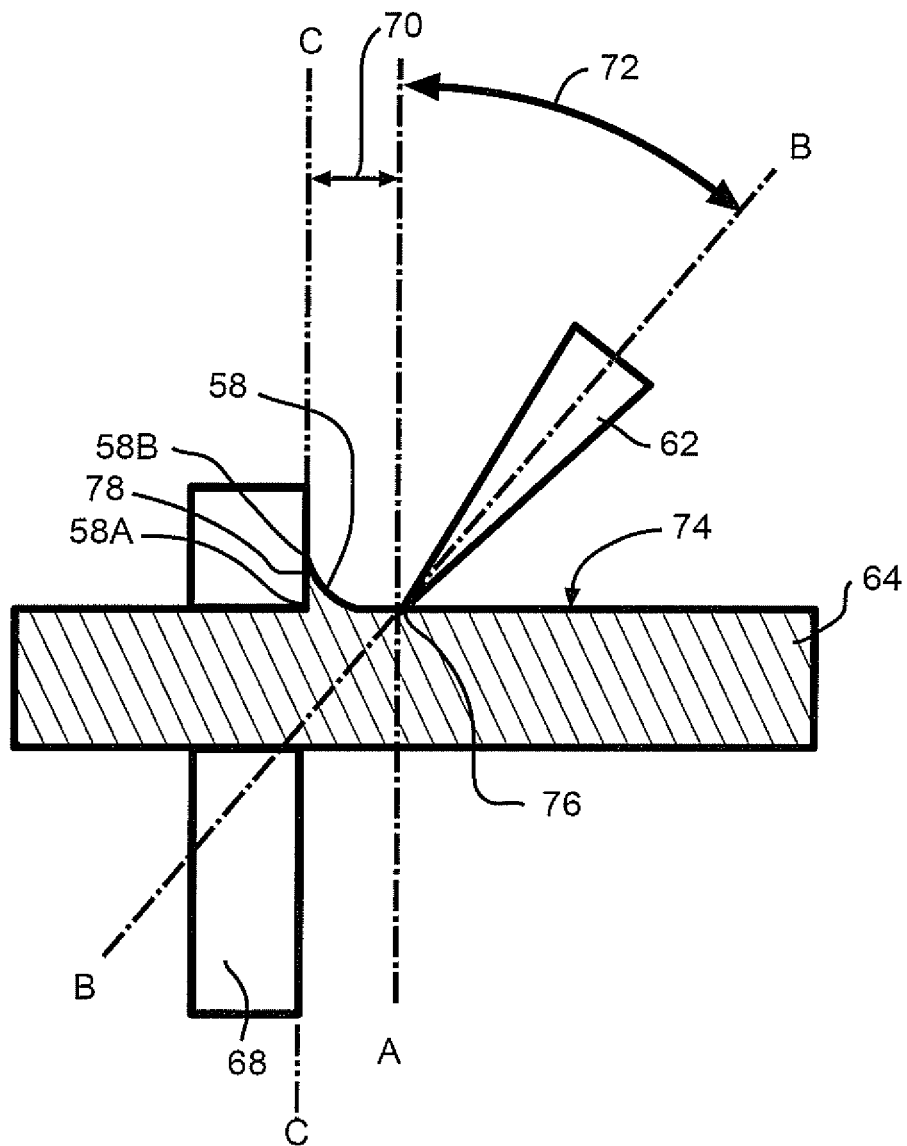
FIG. 6A is a cross-sectional view taken from the side showing an embodiment in which a braze-like laser weld of the present invention is being formed between two work pieces.

In general, as illustrated in FIGS. 6 and 6A, the laser braze weld 58 of the present invention is created when a laser beam 62 is used to impart energy to a portion of a first work piece or first metal 64 such that when it is heated to its melting temperature, the material of the first work piece 64 wets or coats an external surface 66 of an adjacently positioned second work piece or second metal 68. Upon cooling, the laser braze weld 58 is created in which a robust connection between the first and second work pieces 64, 68 is formed. Importantly, the second work piece 68 is not in direct physical contact with the first work piece 64 at the location where the laser beam 62 initially imparts energy to the first work piece 64. Unlike prior laser and resistance welding techniques, a heat affected zone in which two materials inter-diffuse and create an intermetallic bond is not created in the present laser braze weld.

FIG. 6 illustrates an embodiment in which the laser beam 62 is being used to create the braze-like laser weld 58 of the present invention. As illustrated, the first work piece 64 is positioned adjacent the second work piece 68. Preferably, the first work piece 64 is positioned such that it is in physical contact with the second work piece 68. As shown, the second work piece 68 is positioned about perpendicular to the first work piece 64. However, the second work piece 68 may be positioned parallel or at an angle with respect to the second work piece 68.

Creation of the laser braze weld 58 of the present invention is primarily accomplished through a balance of heat and energy that is being directed to the individual work pieces 64, 68 by the laser beam 62. Balance of the appropriate amount of heat and energy between the two work pieces is required such that the exterior surface 66 of the adjoining second work piece 68 becomes coated with the material from the first work piece 64. The appropriate amount of heat and energy is needed to melt a portion of the first work piece 64 as well as excite the material such that it adheres to the adjacent surface 66 of the second work piece 68. In addition, the appropriate amount of heat and energy is needed to provide proper surface energy of the second work piece 68. In addition to the operational settings of the laser instrument, these variables are dependent on the specific materials comprising the first and second work pieces 64, 68.

In addition to heating the first work piece 64, the exterior surface 66 of the second work piece 68 is heated to an appropriate temperature to facilitate adhesion of the first work material 64 to that of the exterior surface 66 of the second work piece 68. In a preferred embodiment, a portion of the first work piece 64 is melted and attracted to the exterior surface 66 of the second work piece 68. The proper balance of heat and energy is preferred to achieve a robust braze-like weld joint 58 of the present invention between the two work pieces 64, 68.

In a preferred embodiment, the proper balance of heat and energy between the first and second work pieces 64, 68 is achieved by material selection, an offset distance 70 between the laser beam 62 and the adjacent second work piece 68, and an incident angle 72 of the laser beam 62 being directed to a surface 74 of the first work piece 64.

As shown in FIGS. 6 and 6A, the incident angle 72 of the laser beam 62 is the angle at which the laser beam 62 is directed to a planar surface portion 74 of the first surface 74 of the first work piece 64. The incident angle 72 is defined as the angle formed between imaginary axis A-A, oriented perpendicular to the planar surface 74 of the first work piece 64, and imaginary axis B-B which traverses through a centerline of the laser beam 62. For example, positioning the laser beam 62 perpendicular to the planar surface 74 of the first work piece 64 would equal an incident angle of 0° whereas positioning the laser beam 62 parallel to the surface 74 of the first work piece 64 would equal an incident angle of about 90°. In a preferred embodiment, the incident angle may range from about 5° to about 45°.

In addition to the incident angle 72, the offset distance 70 greatly affects the amount of heat and energy that is applied to both work pieces 64, 68. The offset distance 70 provides a means with which to change and therefore help balance the amount of heat and energy that is being applied to the first and second work pieces 64, 68. It is noted, however, that in a preferred embodiment, an end 76 of the laser beam 62, is focused directly on the surface 74 of the first work piece 64. The end 76 of the laser beam 62 is not focused on the surface 66 of the second work piece 68 nor is the end 76 of the laser beam 62 focused directly at the interface of the first and second work pieces 64, 68. In a preferred embodiment, it is indirect heat and energy, emanating from the laser beam 62 incident the first work piece 64 that heats the adjacently positioned second work piece 68.

In addition to the proper incident angle 72, achievement of an optimal braze-like laser weld joint 58 of the present invention is largely determined by the proper offset distance 70 between the second work piece 68 and the laser beam 62. Specifically, the offset distance 70 is defined as the distance between the closest portion of the exterior surface 66 of the second work piece 68 and the end 76 of the laser beam 62. As shown in FIGS. 6 and 6A, the offset distance 70 is illustrated as the distance between the end 76 of the laser beam 62 and imaginary axis C-C which is coincident the exterior surface 66 of the second work piece 68. In general, the greater the offset distance 70, the less heat and energy being imparted to the adjacent second work piece 68. On the other hand, as the offset distance 70 decreases and the end 76 of the laser beam 62 becomes closer to the exterior surface 66 of the second work piece 68, the greater the amount of heat and energy that is imparted to the second work piece 68. In a preferred embodiment, the offset distance 70 may range from about 0.0005 inches to about 0.010 inches.

FIG. 6A illustrates an embodiment of the completed weld joint 58 in which the braze-like weld has been formed between the two work pieces 64, 68. As illustrated, the weld 58 may comprise a base potion 58A that extends upwardly in a curved manner to a weld top end 58B. As shown, the weld 58 comprises a boundary line 78 which delineates the material comprising the first work piece 64 from the material comprising the second work piece 68. As illustrated, the weld 58 of the present invention does not comprise an intermetallic bond between the first and second work pieces 64, 68 in which the two metals are inter-diffused within a heat-affected zone. The weld 58 of the present invention is achieved by a surface to surface bonding interaction.

The term "work piece" is defined herein as a metal material that is desired to be joined. A work piece may comprise the first or second metal such as that of at least a portion of a component in an electrochemical cell 10.

In a preferred embodiment, the first and second metals 64, 68 may be of a different composition having dissimilar properties, or alternatively, they may be composed of a similar composition. Examples of materials that may be joined together using the laser braze welding process may comprise aluminum, molybdenum, titanium, nickel, steel, stainless steel, niobium, copper, gold, silver, palladium, molybdenum, tantalum, tungsten, and combinations thereof. The term "braze" is defined herein as the joining of two materials by a surface-to-surface bond interaction. The braze-like joint of the present invention does not comprise inter-metallic bonding within a diffusion zone.

A first metal 64, for example, comprising an aluminum current collector 46, 48, may have a lower melting temperature than that of a second metal 68, for example, a molybdenum terminal pin 30. Furthermore, the first and second metals 64, 68 may have a difference in melting temperature that is greater than 125° C., more preferably greater than 250° C. and most preferably greater than 500° C. Examples of first metals include, but are not limited to, aluminum (melting temperature 660° C.), titanium (melting temperature 1,725° C.), nickel (melting temperature 1,453° C.), steel (melting temperature 1,130° C.), stainless steel (melting temperature 1,353° C.), niobium (melting temperature 2,468° C.), copper (melting temperature 1,083° C.), gold (melting temperature 1,064° C.), silver (melting temperature 961° C.), palladium (melting temperature 1,554° C.), and combinations thereof. Examples of second metals include, but are not limited to, molybdenum (melting temperature 2,617° C.), tantalum (melting temperature 2,996° C.), tungsten (melting temperature 3,410° C.), and combinations thereof. It is contemplated that any or a combination of first metals 64 may be joined together with a second metal 68 as described in the present invention. It is preferred that the current collectors 46, 48 including the tab 50 of the cathode current collector 48 be composed of a first metal 64 and that the terminal pin 30 be composed of a second metal 68.

Figure 7A:
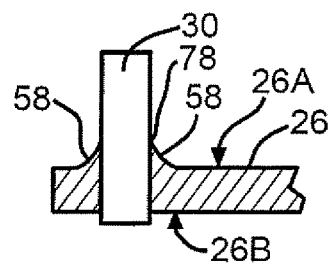
FIGS. 7A-7D are cross-sectional views illustrating various embodiments of a terminal pin 30 joined to a lid 26 using the laser weld of the present invention.
Figure 7B:
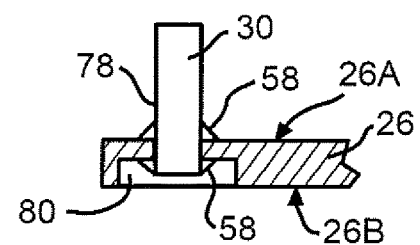

FIGS. 7A to 7D, 8A to 8F, and 9A-9C illustrate various embodiments in which the laser weld 58 of the present invention may be used to join together various components of the electrochemical cell 10. FIGS. 7A to 7D illustrate various embodiments in which the terminal pin 30 may be welded to the lid 26. As shown in FIG. 7A, the terminal pin 30 having a curved cross-section is shown welded within an opening of the lid 26 of the cell 10. The laser weld 58, formed on a top surface 26A of the lid 26 comprises the material of the lid 26 butted up against the surface of the terminal pin 30. Although the weld 58 is illustrated to be positioned on the top surface 26A of the lid 26, the weld 58 may also be positioned extending from a bottom surface 26B of the lid 26. In addition, although the terminal pin 30 is shown positioned about perpendicular with respect to the lid 26, the terminal pin 30 or second work piece 68 may be positioned extending at an angle with respect to the lid 26 or first work piece 64. FIG. 7B illustrates an embodiment of the terminal pin 30 welded in the lid 26 of the cell 10 having a lid cavity portion 80. Similar to FIG. 7A, the laser weld 58 may be positioned extending from the top or bottom surface 26A, 26B of the lid 26.

Figure 7C:
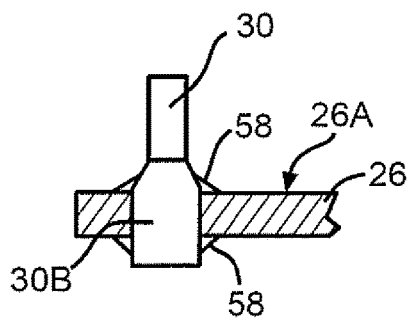
Figure 7D:
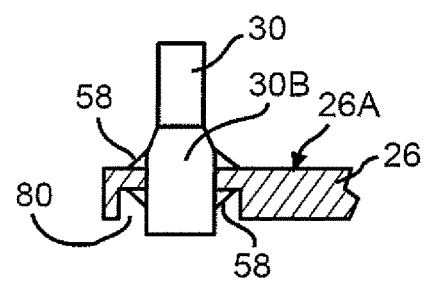

FIGS. 7C and 7D illustrate alternate embodiments of the terminal pin 30 having a rectangular cross section, welded within the lid 26. As shown, the terminal pin 30 comprises a proximal terminal pin end 30B, opposite a distal terminal pin end 30A, having a rectangular cross-section. The proximal terminal pin end 30B may have a wider cross-section as shown or, alternatively, may have a smaller cross-section as compared to its distal terminal pin end 30A. Alternatively, the proximal terminal pin end 30B may act as the coupler 60 to facilitate the joining of the terminal pin 30 to the lid 26. For example, the proximal terminal pin end 30B may comprise a second, lower melting temperature weld material that facilitates joining of the distal terminal pin end 30A to the lid 26.

FIGS. 8A through 8F illustrate various embodiments in which the weld 58 may be positioned with respect to the first and second work pieces. As shown in FIGS. 8A and 8B, a series of welds 58 may be positioned about the perimeter of the cross-sectional diameter of the terminal pin 30 joining the pin 30 to the lid 26, tab 50 portion, or coupler 60. More specifically, as shown in FIGS. 8A, and 8B, the position of each of the welds 58 may be such that they are periodically spaced about the cross-sectional diameter of the terminal pin 30 or second work piece 68. Alternatively, as shown in FIGS. 8E and 8F, the welds 58 may be positioned about the perimeter of the cross-sectional diameter of the terminal pin 30 or second work piece 68 with respect to the lid 26, current collector tab 50, or coupler 60 in an overlapping orientation. FIGS. 8C and 8D illustrate embodiments in which the terminal pin 30 has been welded to the surface of the lid 26, current collector tab 50, or coupler 60. As shown in FIG. 8C, a series of welds 58 may be positioned in a spaced apart manner along the sides of the terminal pin 30. Alternatively, the series of welds 58 may be positioned in an overlapping orientation along the sides of the terminal pin 30.

FIGS. 9A to 9D illustrate additional embodiments of electrochemical cell components that may be created using the welding technique of the present invention. More specifically, these embodiments illustrate ways in which the coupler 60 may be used to facilitate the laser weld 58 of the present invention.

Figure 9A:
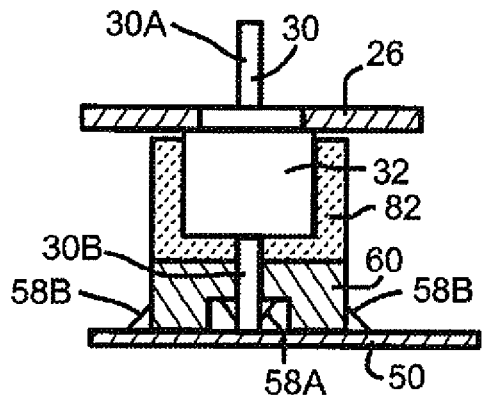
FIGS. 9A-9C show cross-sectional views of alternative embodiments in which the laser weld of the present invention may be used to join components of an electrochemical cell.
Figure 9B:
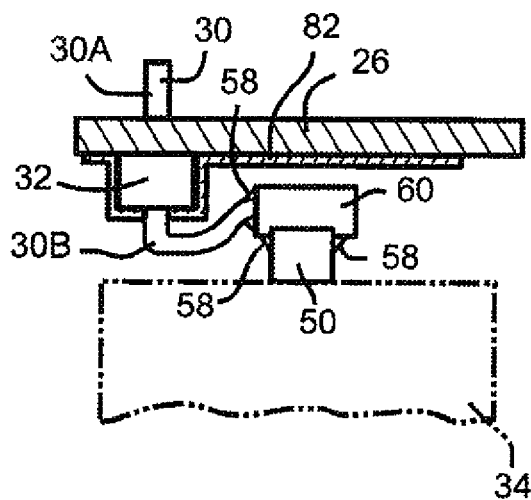
Figure 9C:
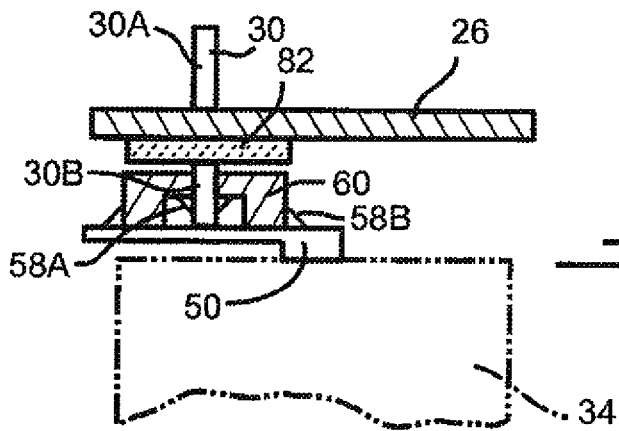
Figure 9D:
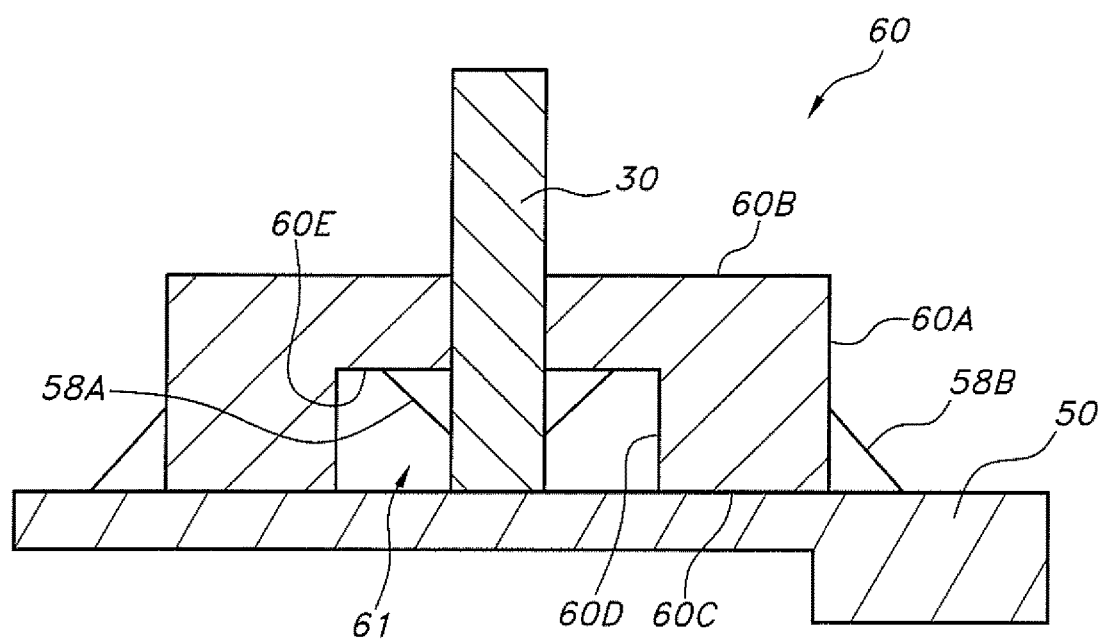
FIG. 9D is an enlarged view of the coupler 60 shown in FIGS. 9A-9C.

FIG. 9D is an enlarged view of the coupler 60 illustrated in FIGS. 9A to 9C. The coupler 60 comprises an annular sidewall 60A having a height extending to and meeting with an upper face wall 60B to a lower face wall 60C. A recess 61 is provided in the lower face wall 60C and extends part-way through the height of the coupler toward, but not in communication with, the upper face wall 60B. That way, the recess 61 forms a secondary annular sidewall 60D extending from the lower face wall 60C to a secondary upper wall 60E. The terminal pin 30 extends through a secondary height of the coupler 60 measured from the upper face wall 60B to the secondary upper wall 60E at the recess 61.

As shown in FIG. 9A, tab 50 of the current collector 46, 48 is welded to the proximal end 30B of the terminal pin 30 utilizing the weld 58A of the present invention. Specifically, weld 58A resides in the recess of the coupler 60. After weld 58A, the current collector tab 50 is contacted to the lower face wall 60C of the coupler where an annular weld 58B is formed between the coupler and the tab 50. The result is an annular contact between a width of the coupler extending between the annular sidewalls 60A and 60D at the lower face wall 60C and the current collector tab 50 (FIGS. 8A to 8F). FIGS. 9A and 9C illustrate that the proximal end 30B of the terminal pin 30 also contacts the current collector tab 50. An insulation layer 82 is positioned between the glass-to-metal seal 32 and the metal coupler 60. Since the direct energy of the laser beam 62 is at a slight distance away from the weld interface during weld formation, materials such as the insulator 82 may be used.

FIG. 9B illustrates another embodiment in which the coupler 60 is used to facilitate a laser braze weld joint of the present invention. As shown, the coupler 60 is positioned between the terminal pin proximal end 30B and the tab 50 of the current collector 46, 48. As shown, an insulation layer 82 may be positioned along the bottom surface 26B of the lid 26 and about the casing of the glass to metal seal 32. In this embodiment, the insulation layer 82 helps create a hermetic lid seal.

FIG. 9C shows another embodiment where the coupler 60 joins various electrochemical cell components together. As shown, the terminal pin 30 extends through an opening of the lid 26 and coupler 60 such that the terminal pin 30 is positioned about perpendicular to the side of the coupler 60. As shown, a first weld 58A is formed joining the terminal pin proximal end 30B to the coupler 60. In addition, a second weld 58B is formed about the exterior surface of the coupler 60 joining the tab 50 to the coupler 60. Thus, the coupler 60 facilitates the joining of the tab 50 with that of the terminal pin 30.

FIG. 10 is a micrograph image that depicts a cross-sectional view of the laser braze weld 58 of the present invention. As shown in the image, the weld 58 comprises a joining of the first work piece (i.e. lid portion 26) and second work piece (i.e. terminal pin 30). As shown, a portion of the material comprising the lid portion 26 extends upwardly along the external surface of the terminal pin 30. The weld 58 shown has a curved exterior surface. The boundary line 78 that delineates the first and second work pieces is shown in the micrograph. As shown in FIG. 10, there is a clear distinction between the two metals as indicated by the two surface textures of the different metals. Although the present example shown in FIG. 10 is that of a terminal pin 30 joined to the lid 26, the terminal pin 30 may also be joined to a portion of the coupler 60 or tab 50 of the current collector 46, 48.

As previously mentioned, the present invention is applicable to either primary or secondary electrochemical cells. A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on a metallic anode current collector 46.

The cathode of a primary cell is of electrically conductive material, preferably a solid material. The solid cathode may comprise a metal element, a metal oxide, a mixed metal oxide and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell 10, the cathode active material is mixed with a binder material such as a powdered fluoropolymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

The cathode component 40, 42 may be prepared by rolling, spreading or pressing the cathode active mixture onto a suitable cathode current collector 48. Cathodes prepared as described are preferably in the form of a strip wound with a corresponding strip of anode material in a structure similar to a "jellyroll" or a flat-folded electrode stack.

In order to prevent internal short circuit conditions, the cathode electrode 40, 42 is separated from the anode electrode 36, 38 by the separator membrane 44. The separator membrane 44 is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative case negative primary cell, the active material of cathode body is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In secondary electrochemical systems, the anode electrode 42, 44 comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties that permit them to be fabricated into rigid electrodes capable of withstanding degradation during repeated charge/discharge cycling.

The cathode electrode 40, 42 of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

The lithiated active material is preferably mixed with a conductive additive selected from acetylene black, carbon black, graphite, and powdered metals of nickel, aluminum, titanium and stainless steel. The electrode further comprises a fluoro-resin binder, preferably in a powder form, such as PTFE, PVDF, ETFE, polyamides and polyimides, and mixtures thereof. The current collector 46, 48 is selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode or counter electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto.

Now, it is therefore apparent that the present invention has many features among which are reduced manufacturing cost and construction complexity. While embodiments of the present invention have been described in detail, that is for the purpose of illustration, not limitation.

What is claimed is:
1. An electrochemical cell, comprising:
   a) a casing;
   b) an electrode assembly contained within the casing, the electrode assembly comprising:
      i) an anode composed of an anode active material contacted to an anode current collector;
      ii) a cathode composed of a cathode active material contacted to a cathode current collector; and
      iii) an intermediate separator preventing direct physical contact between the anode and the cathode while permitting ionic flow therebetween;
   c) a glass-to-metal seal supported in an opening in the casing, the glass-to-metal seal comprising a terminal pin in a non-conductive relationship with the casing, wherein a distal pin portion resides outside the casing and a proximal pin portion is inside the casing;
   d) a coupler comprising an annular sidewall having a height extending to and meeting with an upper face wall and a lower face, wherein a recess extends from the lower face wall part-way through the coupler height toward, but not in communication with, the upper face wall, wherein the terminal pin is supported by the coupler with the proximal pin portion residing in the recess,
   e) wherein a first weld connects the coupler to the proximal pin portion in the recess and a second weld connects the annular sidewall of the coupler to a tab for one of the anode current collector and the cathode current collector,
   f) wherein the other of the anode current collector and the cathode current collector not joined to the coupler is electrically connected to a second terminal for the cell; and
   g) an electrolyte contained inside the casing to activate the electrode assembly.

2. The electrochemical cell of claim 1 wherein the lower face wall of the coupler contacts the tab of the current collector with the second weld connecting the coupler to the tab surrounding the first weld connecting the coupler to the proximal terminal pin portion.

3. The electrochemical cell of claim 1 wherein a width of the coupler extending from the annular sidewall to the recess at the lower face wall contacts the tab of the current collector with the second weld connecting the coupler to the tab surrounding the first weld connecting the coupler to the proximal terminal pin portion.

4. The electrochemical cell of claim 1 wherein the one of the anode current collector and the cathode current collector connected to the coupler is of a first metal having a first melting temperature and the terminal pin is of a second metal having a second melting temperature, and the first melting temperature and the second melting temperature differ by at least about 500° C.

5. The electrochemical cell of claim 4 wherein the first metal of the one of the anode current collector and the cathode current collector is selected from the group consisting of aluminum, titanium, nickel, steel, stainless steel, niobium, copper, gold, silver, platinum, palladium, and combinations thereof.

6. The electrochemical cell of claim 4 wherein the second metal of the terminal pin is selected from the group consisting of molybdenum, tantalum, tungsten, and combinations thereof.

7. The electrochemical cell of claim 4 wherein the coupler is of a third metal selected from the group consisting of aluminum, titanium, nickel and stainless steel.

8. The electrochemical cell of claim 4 wherein the third melting temperature of the coupler is at least about 125° C. less than the second melting temperature of the terminal pin.

9. The electrochemical cell of claim 1 wherein at least one of the first and second welds is devoid of an intermetallic bond.

10. The electrochemical cell of claim 1 wherein at least one of the first and second welds comprises a boundary line that delineates the respective coupler from the proximal pin portion and the coupler from the tab of the one of the anode current collector and the cathode current collector of the first metal.

11. The electrochemical cell of claim 1 wherein at least one of the first and second welds is characterized as having been formed using a laser beam.

12. The electrochemical cell of claim 1 wherein the anode active material is selected from the group consisting of lithium, lithium alloys, lithium silver, lithium aluminum, lithium boron, lithium silver boron, carbon, and combinations thereof.

13. The electrochemical cell of claim 1 wherein the cathode active material is selected from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide, and mixtures thereof.

14. The electrochemical cell of claim 1 wherein the electrolyte comprises a nonaqueous solvent having an ionically conductive salt dissolved therein.

15. The electrochemical cell of claim 1 wherein an insulator is intermediate the glass-to-metal seal and the coupler.

16. An electrochemical cell, comprising:
a) a casing;
b) an electrode assembly contained within the casing, the electrode assembly comprising:
  i) an anode composed of an anode active material contacted to an anode current collector;
  ii) a cathode composed of a cathode active material contacted to a cathode current collector; and
  iii) an intermediate separator preventing direct physical contact between the anode and the cathode while permitting ionic flow therebetween,
  iv) wherein one of the anode current collector and the cathode current collector is composed of a first metal selected from the group consisting of aluminum, titanium, nickel, steel, stainless steel, niobium, copper, gold, silver, platinum, palladium, and combinations thereof, the first metal having a first melting temperature;
c) a glass-to-metal seal supported in an opening in the casing, the glass-to-metal seal comprising a terminal pin in a non-conductive relationship with the casing, wherein a distal pin portion resides outside the casing and a proximal pin portion is inside the casing, and wherein the terminal pin is of second metal selected from the group consisting of molybdenum, tantalum, tungsten, and combinations thereof;
d) a coupler comprising an annular sidewall having a height extending to and meeting with an upper face wall and a lower face, wherein a recess extends from the lower face wall part-way through the height toward, but not in communication with, the upper face wall, wherein the terminal pin is supported by the coupler with the proximal pin portion residing in the recess, and wherein the coupler is of a third metal selected from the group consisting of aluminum, titanium, nickel and stainless steel, the third metal having a third melting temperature that is less than the second melting temperature of the terminal pin,
e) wherein a first weld connects the coupler to the proximal pin portion in the recess and a second weld connects the annular sidewall of the coupler to a tab for one of the anode current collector and the cathode current collector,
f) wherein the other of the anode current collector and the cathode current collector not joined to the coupler is electrically connected to a second terminal for the cell; and
g) an electrolyte contained within the casing to activate the electrode assembly.

17. The electrochemical cell of claim 16 wherein the lower face wall of the coupler contacts the tab of the current collector with the second weld connecting the coupler to the tab surrounding the first weld connecting the coupler to the proximal terminal pin portion.

18. The electrochemical cell of claim 16 wherein a width of the coupler extending from the annular sidewall to the recess at the lower face wall contacts the tab of the current collector with the second weld connecting the coupler to the tab surrounding the first weld connecting the coupler to the proximal terminal pin portion.

19. The electrochemical cell of claim 16 wherein the one of the anode current collector and the cathode current collector connected to the coupler is of a first metal having a first melting temperature and the terminal pin is of a second metal having a second melting temperature, and the first melting temperature and the second melting temperature differ by at least about 500° C.

20. The electrochemical cell of claim 16 wherein the third melting temperature of the coupler is at least about 125° C. less than the second melting temperature of the terminal pin.

* * * * *